United States Patent
Huber et al.

(10) Patent No.: US 10,774,244 B2
(45) Date of Patent: Sep. 15, 2020

(54) SOLID INSULATION MATERIAL

(71) Applicant: Siemens Aktiengesellschaft, Munich (DE)

(72) Inventors: Jürgen Huber, Erlangen (DE); Dieter Schirm, Breitengüssbach (DE); Matthias Übler, Ursensollen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 59 days.

(21) Appl. No.: 15/745,530

(22) PCT Filed: May 19, 2016

(86) PCT No.: PCT/EP2016/061311
§ 371 (c)(1),
(2) Date: Jan. 17, 2018

(87) PCT Pub. No.: WO2017/012737
PCT Pub. Date: Jan. 26, 2017

(65) Prior Publication Data
US 2018/0215960 A1 Aug. 2, 2018

(30) Foreign Application Priority Data

Jul. 17, 2015 (DE) .................. 10 2015 213 535

(51) Int. Cl.
*H01B 3/00* (2006.01)
*H01B 3/40* (2006.01)
*H02K 3/30* (2006.01)
*H02K 3/40* (2006.01)
*B32B 5/16* (2006.01)
*B32B 19/04* (2006.01)
*C09J 7/38* (2018.01)
*B32B 7/12* (2006.01)
*C09J 7/21* (2018.01)
(Continued)

(52) U.S. Cl.
CPC .............. *C09J 7/381* (2018.01); *B32B 7/12* (2013.01); *C09J 7/21* (2018.01); *C09J 9/00* (2013.01); *H01B 3/002* (2013.01); *H01B 3/40* (2013.01); *H01B 3/446* (2013.01); *H01B 3/447* (2013.01); *H02K 3/30* (2013.01); *H02K 3/40* (2013.01); *B32B 3/266* (2013.01); *B32B 5/02* (2013.01); *B32B 5/16* (2013.01); *B32B 5/24* (2013.01); *B32B 19/045* (2013.01); *B32B 19/06* (2013.01); *B32B 2260/02* (2013.01); *B32B 2260/021* (2013.01); *B32B 2260/046* (2013.01); *B32B 2307/206* (2013.01); *B32B 2307/304* (2013.01); *B32B 2315/10* (2013.01); *B32B 2329/00* (2013.01); *B32B 2367/00* (2013.01); *B32B 2457/04* (2013.01); *C09J 2400/12* (2013.01); *C09J 2400/263* (2013.01); *C09J 2431/00* (2013.01); *H01B 3/008* (2013.01); *H01B 3/307* (2013.01); *H01B 3/421* (2013.01); *H01B 3/422* (2013.01); *H01B 3/423* (2013.01); *H01B 3/425* (2013.01); *H01B 3/48* (2013.01); *H01B 3/50* (2013.01); *H01B 7/02* (2013.01); *Y10T 428/24331* (2015.01); *Y10T 428/251* (2015.01); *Y10T 428/254* (2015.01); *Y10T 428/2911* (2015.01)

(58) Field of Classification Search
None
See application file for complete search history.

(56) References Cited

U.S. PATENT DOCUMENTS 3,369,947 A    2/1968  Willi et al. ................. 156/51
3,560,320 A *  2/1971  Letteron ................. H01B 3/04
                                                  174/121 SR
(Continued)

FOREIGN PATENT DOCUMENTS

CA    2135566 A1 *  6/1995  ........... B29C 70/025
CH     454441 A      4/1968  ............... B05D 1/18
(Continued)

OTHER PUBLICATIONS

Carrot et al, Polyvinyl Butyral, Dec. 2015, Handbook of Thermoplastics (Year: 2015).*

(Continued)

*Primary Examiner* — Jeffrey A Vonch
(74) *Attorney, Agent, or Firm* — Slayden Grubert Beard PLLC

(57) ABSTRACT

The present disclosure relates to insulation. Teachings thereof may be embodied in a solid insulation material, especially in tape form, the use thereof in a vacuum impregnation process and to an insulation system produced therewith, and also an electrical machine comprising the insulation system, especially for the medium- and high-voltage sector, namely for medium- and high-voltage machines, especially rotating electrical machines in the medium- and high-voltage sector, and to semifinished products for electrical switchgear. For example a solid insulation material with an anhydride-free impregnating agent may include: a carrier; a barrier material; a curing catalyst; and a tape adhesive. The curing catalyst and the tape adhesive are inert toward one another but react under the conditions of a vacuum impregnation process if combined with an anhydride-free impregnating agent having gelation times of 1 h to 15 h at impregnation temperature. The tape adhesive is free of oxirane groups and includes at least two free hydroxyl groups.

16 Claims, No Drawings

(51) Int. Cl.

| | |
|---|---|
| *C09J 9/00* | (2006.01) |
| *H01B 3/44* | (2006.01) |
| *H01B 3/42* | (2006.01) |
| *H01B 3/50* | (2006.01) |
| *H01B 7/02* | (2006.01) |
| *H01B 3/30* | (2006.01) |
| *H01B 3/48* | (2006.01) |
| *B32B 19/06* | (2006.01) |
| *B32B 5/02* | (2006.01) |
| *B32B 5/24* | (2006.01) |
| *B32B 3/26* | (2006.01) |

(56) References Cited

U.S. PATENT DOCUMENTS

| | | | | |
|---|---|---|---|---|
| 3,647,611 | A * | 3/1972 | Mertens | H01B 3/04 428/324 |
| 3,808,086 | A | 4/1974 | Mosimann et al. | 442/296 |
| 3,841,959 | A * | 10/1974 | Mertens | H01B 3/04 442/117 |
| 3,842,019 | A * | 10/1974 | Kropp | C08F 4/00 522/59 |
| 4,222,802 | A * | 9/1980 | Sakai | C08G 59/4028 156/53 |
| 4,265,966 | A * | 5/1981 | Schuh | C08G 63/6856 156/53 |
| 4,503,211 | A * | 3/1985 | Robins | C08G 59/5093 528/92 |
| 4,606,785 | A * | 8/1986 | Zeise | B32B 19/06 156/305 |
| 4,668,758 | A * | 5/1987 | Corley | C08G 59/68 528/408 |
| 5,032,453 | A | 7/1991 | Rogler et al. | 428/324 |
| 5,278,247 | A * | 1/1994 | Miyazono | C07C 275/06 525/327.3 |
| 5,314,984 | A | 5/1994 | Markovitz et al. | 528/117 |
| 5,344,890 | A * | 9/1994 | Miyazono | C08G 59/40 525/326.5 |
| 5,393,805 | A * | 2/1995 | Koyama | C08G 59/18 428/413 |
| 5,674,340 | A * | 10/1997 | Swiatkowski | B32B 19/00 156/184 |
| 5,705,009 | A * | 1/1998 | Baier | B29C 35/08 156/192 |
| 6,331,583 | B1 * | 12/2001 | Walker | C08G 59/18 523/402 |
| 9,914,804 | B2 | 3/2018 | Malet et al. | |
| 2004/0094325 | A1 * | 5/2004 | Yoshida | H02K 3/345 174/120 R |
| 2005/0189834 | A1 * | 9/2005 | Ikeda | H02K 3/34 310/179 |
| 2007/0173151 | A1 | 7/2007 | Kapitza et al. | 442/149 |
| 2013/0244022 | A1 * | 9/2013 | Rueger | C09D 5/24 428/324 |
| 2014/0329023 | A1 * | 11/2014 | Di Gianni | H01B 19/04 427/493 |
| 2015/0361245 | A1 | 12/2015 | Brockschmidt et al. | 523/458 |
| 2016/0247596 | A1 * | 8/2016 | Ho | C08L 63/00 |
| 2018/0371153 | A1 * | 12/2018 | Beisele | C08G 59/4007 |
| 2019/0080818 | A1 * | 3/2019 | Beisele | H02K 3/30 |
| 2019/0190341 | A1 * | 6/2019 | Beisele | H02K 15/105 |

FOREIGN PATENT DOCUMENTS

| | | | | |
|---|---|---|---|---|
| CH | 696992 A5 | * | 2/2008 | H01B 3/04 |
| CN | 1062545 A | | 7/1992 | C08F 267/10 |
| CN | 102300906 A | | 12/2011 | C08G 69/02 |
| DE | 2215206 A1 | | 10/1972 | H01B 3/04 |
| DE | 8905612 U1 | * | 6/1989 | H01B 3/04 |
| EP | 0198195 A2 | | 10/1986 | C08G 59/00 |
| EP | 0355558 A1 | | 2/1990 | C08L 63/10 |
| EP | 2763142 A1 | | 8/2014 | B82Y 30/00 |
| GB | 1014895 A | * | 12/1965 | C08L 67/06 |
| GB | 1208718 A | * | 10/1970 | H01B 3/04 |
| JP | 57101555 U | * | 6/1982 | |
| JP | 07149928 A | * | 6/1995 | |
| JP | 11213757 A | * | 8/1999 | |
| JP | 11215753 A | * | 8/1999 | |
| RU | 2044349 C1 | | 9/1995 | H01B 3/40 |
| RU | 2356116 C1 | | 5/2009 | H01B 3/40 |
| WO | 2017/012737 A1 | | 1/1917 | H02K 15/12 |
| WO | 2005/076290 A1 | | 8/2005 | H01B 1/20 |

OTHER PUBLICATIONS

Machine Translation of JP 11215753 A, Aug. 1999 (Year: 1999).*
Machine Translation of CH 696992 A5, Feb. 2008 (Year: 2008).*
Madhu, Difference Between Saturated and Unsaturated Polyester Resin, Aug. 2018 (Year: 2018).*
Park et al., Studies on epoxy resins cured by cationic latent thermal catalysts: The effect of the catalysts on the thermal, rheological, and mechanical properties, Jan. 2001, vol. 39, Issue 1, pp. 187-195 (Year: 2001).*
Subrayan et al., Catalysis of Thermally Curable High Solids Cycloaliphatic Epoxy Formulations, 2001, Polymeric Materials: Science & Engineering, vol. 85 (Year: 2001).*
Hartz et al., Role of Oxonium, Sulfonium, and Carboxonium Dications in Superacid-Catalyzed Reactions, 1993, Journal of the American Chemical Society, vol. 115, pp. 1277-1285 (Year: 1993).*
Takahashi et al., Novel Sulfonium Salts and their Properties, 1999, Journal of Photopolymer Science and Technology, vol. 12, Issue 1, pp. 147-152 (Year: 1999).*
Kim et al., Thermoinitiated Cationic Polymerization of Epoxy Resin by Sulfonium Salts for Latent Curing, Jun. 2012, Adhesion and Interface, vol. 13, pp. 53-57 (Year: 2012).*
Chinese Office Action, Application No. 201680041819.X, 13 pages, dated Mar. 22, 2019.
Schmidt, W. et al., "Dynamik mit Verantwortung Umweltverträgliche Harzimprägnierung elektrischer Maschinen mittels Stromwärme," XP055291406; URL:https://nachhaltigwirtschaften.at/resources/fdz pdf/endbericht 0662harzimpraegnierung.pdf?m=1467900838, 92 pages (German w/ English abstract), 2006.
German Office Action, Application No. 102015213535.7, 9 pages, dated May 3, 2016.
International Search Report and Written Opinion, Application No. PCT/EP2016/061311, 19 pages, dated Aug. 2, 2016.
Russian Office Action, Application No. 8101407/07, 9 pages, dated Dec. 5, 2018.
Indian Office Action, Application No. 201717046317, 6 pages, dated Jan. 21, 2020.

* cited by examiner

SOLID INSULATION MATERIAL

CROSS-REFERENCE TO RELATED APPLICATIONS

This application is a U.S. National Stage Application of International Application No. PCT/EP2016/061311 filed May 19, 2016, which designates the United States of America, and claims priority to DE Application No. 10 2015 213 535.7 filed Jul. 17, 2015, the contents of which are hereby incorporated by reference in their entirety.

TECHNICAL FIELD

The present disclosure relates to insulation. Teachings thereof may be embodied in a solid insulation material, especially in tape form, the use thereof in a vacuum impregnation process and to an insulation system produced therewith, and also an electrical machine comprising the insulation system, especially for the medium- and high-voltage sector, namely for medium- and high-voltage machines, especially rotating electrical machines in the medium- and high-voltage sector, and to semifinished products for electrical switchgear.

BACKGROUND

Electrical machines (motors, generators) have, in the majority of the longitudinal grooves of their stator laminate stacks, special types of coil windings or conductor bars, generally made from copper or another material of high conductivity. In the case of an electric motor, by supplying current in a time-selective manner, a magnetic field propagating in all directions is generated, and this drives the freely rotating rotor suspended in the stator cavity, and the rotor reacts to the induced magnetic field in the form of forced rotation, for example owing to a multitude of applied permanent magnets, and hence converts electrical energy to kinetic energy. In electrical terms, the laminate stack is at ground potential, but the coils are at high kilovolt potential. The coils fitted into the stator grooves must accordingly be electrically insulated with respect to ground potential. For this purpose, each and every coil is insulated, for example, with a special tape, for example mica tape, repeatedly and with defined overlap.

Mica is capable of retarding electrical erosion under electrical partial discharges effectively and for a long period, for example over the entire lifetime of the machine, and has good chemical and thermal stability. Mica tapes consist of mica paper and one or more carriers, for example fabrics, film(s), bonded to one another via a tape adhesive. Mica paper alone does not have the mechanical strength needed for an insulation process. According to the application, additives may be added to the tape adhesive, for example curing catalysts, which have an initiating effect on the thermal curing of an externally applied impregnating agent: after the mica tape-insulated coils have been fitted into the stator laminate stacks and electrically connected, for avoidance of partial discharges during later operation, the air in the cavities of the windings and especially in the groove gaps of the stator laminate stack may be eliminated. Since this distance from current-carrying isolated coil to the laminate stack is generally kept as small as possible, field strengths of several kV/mm there are not unusual. There is corresponding stress on the insulation material.

Impregnating agents suitable for vacuum impregnation processes may include thermally curable epoxy resin/anhydride mixtures. They are used for impregnation of the stators of the electrical machines, composed of the individual parts thereof, with the fitted and mica tape-insulated coils, or for individual coil or conductor bar impregnation.

During the VPI (vacuum pressure impregnation) process, these stators or coils are typically wholly flooded with a mobile epoxy resin/phthalic anhydride formulation in a vacuum chamber and then thermally gelated under pressure. The final curing is generally under standard pressure in an industrial oven. The function of the curing catalyst here is for the mobile impregnating agent, usually composed of epoxy resin and phthalic anhydride, to gelate within a particular period at a given temperature. The industrial standard impregnating agent in this regard has to date been a mixture of distilled bisphenol A diglycidyl ether and methylhexahydrophthalic anhydride. This mixture is sufficiently mobile to assure the complete impregnation of the tape insulation on the one hand and, in the absence of curing catalysts, sufficient storage stability on the other hand. The curing catalyst is generally at least also present in the solid insulation material, for example mica tape. This mica tape is held together by the tape adhesive, and so it is essential that the tape adhesive and the curing catalyst are inert to one another.

In general, the three components, i.e. tape adhesive, curing catalyst, and charged impregnating agent, do not react until the moment they encounter one another during the VPI process. In this way, the best possible crosslinking and attachment, compatibility and freedom of the insulation from cavities are achieved, which leads in turn to an optimized lifetime of the "main insulation" of the electrical machine formed thereafter in the course of curing.

SUMMARY

Owing to toxicological concerns about the unrestricted use of phthalic anhydrides, impregnating agents used in the future will be phthalic anhydride-free or completely anhydride-free epoxy-based impregnating agents, which are polymerized using curing catalysts. The curing catalysts are matched to the anhydride-free impregnating agents. There is increasing use of anhydride-free impregnating agents, as known from the prior applications DE 102014219844.5; DE 102014221715.6; DE 102015205328.8; DE 102015202053.3; DE 102015208527.9; DE 102015204885.3, the disclosure content of which is hereby incorporated into the present description. These entail the use of curing catalysts, for example imidazoles, piperazines, and derivatives thereof, which in turn require different tape adhesives in the solid insulation material with which they have sufficient storage stability.

The teachings of the present disclosure may provide a solid insulation material and especially a tape adhesive for a solid insulation material, and for the use of the solid insulation material in a vacuum impregnation process and, ultimately, an electrical machine with an insulation system produced in such a way, avoiding use of the respiratory pathway-sensitizing phthalic anhydrides.

For example, a solid insulation material usable together with an anhydride-free impregnating agent for production of an insulation system in a vacuum impregnation process, may include a carrier, a barrier material, a curing catalyst, and a tape adhesive. The curing catalyst and the tape adhesive are inert toward one another but react under the conditions of the vacuum impregnation with an anhydride-free impregnating agent with gelation times of 1 h to 15 h at impregnation temperature, wherein the tape adhesive is free of oxirane groups, and wherein the tape adhesive has at least two free hydroxyl groups, i.e. for example is a diol, triol, and/or polyol.

In some embodiments, the tape adhesive within a temperature range from 60° C. to 70° C. shows a viscosity between 0.5 and 100 Pas, between 1 and 50 Pas, or between 2 and 20 Pas.

In some embodiments, the tape adhesive is a tricyclodecanedimethanol.

In some embodiments, the tape adhesive only melts and/or softens at a temperature above 100° C.

In some embodiments, the tape adhesive is a polyvinyl acetal.

In some embodiments, the tape adhesive is selected from the group of the following compounds: lactones, caprolactones, polycaprolactones, hydroxy-functional polycaprolactones; ester polyols, polyester polyols, linear polyester polyols, branched polyester polyols, hydroxy-functional polyester polyols, hydroxy-functional dendritic polyester polyols, polyester polyols based on propionic acid, based on alkyl-substituted propionic acid, such as a polyester polyol based on a bis(hydroxyalkyl)propionic acid, for example a polyol based on 2,2-bis(hydroxymethyl)propionic acid; acetals, vinyl acetals, polyvinyl acetals, hydroxy-functional polyvinyl acetals, for example butyrals, vinyl butyrals, polyvinyl butyrals, hydroxy-functional polyvinyl butyrals; acetaldehydes, vinylacetaldehydes, polyvinylacetaldehydes, hydroxy-functional polyvinylacetaldehydes; formals, vinyl formals, polyvinyl formals, hydroxy-functional polyvinyl formals; copolymers of acrylic acid, copolymers of acrylic acid with tricycloalkanes, for example a copolymer of acrylic acid and 4,8-bis(hydroxymethyl)tricyclo[$5.2.1.0^{2,6}$] decane with CAS number 26896-48-0. All the aforementioned compounds may be in hydroxy-functional form, and any mixtures, copolymers, and/or blends of the aforementioned compounds.

In some embodiments, the tape adhesive is selected from the group of the polyvinyl acetals, characterized in that the content of free hydroxyl groups calculated as polyvinyl alcohol is less than 35 mol %, less than 30 mol %, or less than 25 mol %.

In some embodiments, the curing catalyst is selected from the following compounds: cationic superacids and/or superacid salts, for example sulfonium derivatives based on hexafluoroantimonates, tetrafluoroborates or hexafluorophosphates, but also anionic imidazoles, imidazole derivatives, vacuum-stable imidazoles, especially alkylimidazoles, for example alkylmethylimidazole, especially 1-decyl-2-methylimidazole, dialkylpyrazole, 3,5-dimethylpyrazole, piperazines, and/or piperazine derivatives, and any mixtures of the aforementioned compounds.

In some embodiments, there is a carrier in the form of woven fabric, nonwoven fabric and/or film.

In some embodiments, there is a perforated film.

In some embodiments, there is a particulate barrier material.

In some embodiments, the particulate barrier material comprises barrier material particles at least partly in platelet form.

In some embodiments, the particles of the barrier material have been coated.

In some embodiments, the coating comprises a metal oxide.

In some embodiments, the coating has been doped.

In some embodiments, there is a tape adhesive in an amount in the range from 1% to 30% by weight, 2% to 15% by weight, or 5% to 10% by weight.

In some embodiments, there is a curing catalyst in a concentration of less than 10% by weight, for example from 0.001% by weight to 7.5% by weight, in the range from 0.01% to 5% by weight, or from 0.1% by weight to 3.5% by weight.

Another example may include use of an insulation system produced by vacuum impregnation with a solid insulation material as described above in medium- and high-voltage machines, especially rotating electrical machines in the medium- and high-voltage sector and in electrical switchgear, medium- and high-voltage applications, bushings, transformer bushings, generator bushings and/or HVDC bushings, and in corresponding semifinished products.

As another example, an electrical machine, such as a rotating electrical machine, e.g., in the medium- and high-voltage sector and electrical switchgear, medium- and high-voltage application, bushing, transformer bushing, generator bushing and/or HVDC bushing, and corresponding semifinished product, may include an insulation system produced from a solid insulation material as described above.

DETAILED DESCRIPTION

The teachings of the present disclosure may provide a solid insulation material usable together with an anhydride-free impregnating agent for production of an insulation system in a vacuum impregnation process, wherein said insulation material comprises a carrier, a barrier material, a curing catalyst and a tape adhesive, the curing catalyst and the tape adhesive are inert toward one another but react under the conditions of the vacuum impregnation with an anhydride-free impregnating agent with gelation times of 1 h to 15 h at impregnation temperature, wherein the tape adhesive is free of oxirane groups.

Some embodiments may enagle the use of the insulation system thus produced in electrical machines, in rotating electrical machines, and/or in rotating electrical machines in the medium- and high-voltage sector and in electrical switchgear, medium- and high-voltage applications, bushings, transformer bushings, generator bushings and/or HVDC bushings, and in corresponding semifinished products.

Some embodiments may include electrical machines, rotating electrical machines, and/or rotating electrical machines in the medium- and high-voltage sector and electrical switchgear, medium- and high-voltage applications, bushings, transformer bushings, generator bushings and/or HVDC bushings, and corresponding semifinished products, comprising an insulation system of this kind.

In some embodiments, there are molecules having at least two free hydroxyl groups, e.g., for example diols, triols and/or polyols, have been found to be suitable tape adhesives.

In some embodiments, resinous di- or polyols are used in the form of viscous to highly viscous materials within a temperature range from room temperature to about 100° C. More particularly, suitable materials have been found to be those that exhibit a viscosity within a temperature range from 60 to 70° C. between 0.5 and 100 Pas, preferably between 1 and 50 Pas, especially preferably between 2 and 20 Pas. For example, tricyclodecanedimethanol (CAS 26896-48-0) fulfills this specification. Secondly, solid thermoplastic di- and/or polyols that melt and/or soften only at temperatures over and above 100° C. are also usable as tape adhesives. For example, polyvinyl butyrals fulfill this specification. Of course, the suitable materials have adequate adhesion or tack with respect to the carrier and/or the barrier material in order that they are usable as tape adhesives.

In some embodiments, the tape adhesives are selected such that they are sufficiently soluble in the impregnating agent. For this purpose, the tape adhesives used may have a polarity matched to the impregnating agent.

For example, the following compounds with hydroxyl functionality may be used as tape adhesives:

lactones, caprolactones, polycaprolactones, hydroxy-functional polycaprolactones;

ester polyols, polyester polyols, linear polyester polyols, branched polyester polyols, hydroxy-functional polyester polyols, hydroxy-functional dendritic polyester polyols, polyester polyols based on propionic acid, based on alkyl-substituted propionic acid, such as a polyester polyol based on a bis(hydroxyalkyl)propionic acid, for example a polyol based on 2,2-bis(hydroxymethyl)propionic acid;

acetals, vinyl acetals, polyvinyl acetals, hydroxy-functional polyvinyl acetals, for example butyrals, vinyl butyrals, polyvinyl butyrals, hydroxy-functional polyvinyl butyrals;

acetaldehydes, vinylacetaldehydes, polyvinylacetaldehydes, hydroxy-functional polyvinylacetaldehydes;

formals, vinyl formals, polyvinyl formals, hydroxy-functional polyvinyl formals;

copolymers of acrylic acid, copolymers of acrylic acid with tricycloalkanes, for example a copolymer of acrylic acid and 4,8-bis(hydroxymethyl)tricyclo[5.2.1.0$^{2,6}$] decane with CAS number 26896-48-0. More particularly, mixtures and/or copolymers and/or blends of the aforementioned compounds are also suitable as tape adhesives.

In some embodiments, the tape adhesive is selected from the group of the polyvinyl acetals, wherein the content of free hydroxyl groups calculated as polyvinyl alcohol is less than 35 mol %, less than 30 mol %, or less than 25 mol %.

Owing to their hydroxyl groups, di- or polyols are suitable for polymerization into cationically or anionically curing formulations, especially also those that are free of phthalic anhydride.

The compounds that are disclosed here for the first time as tape adhesives may also be suitable as carriers for cationically active curing catalysts. For this purpose, they exhibit only slight catalysis, if any, of the bimolecular hydroxyl etherification reaction with the curing catalysts, even at elevated temperature around 70° C.

Suitable curing catalysts in the anhydride-free systems are, for example, the cationic superacids and/or superacid salts, for example sulfonium derivatives based on hexafluoroantimonates, tetrafluoroborates or hexafluoro-phosphates, but also the anionic imidazoles, imidazole derivatives, vacuum-stable imidazoles, e.g., alkylimidazoles, for example alkylmethylimidazole, e.g., 1-decyl-2-methylimidazole, and dialkylpyrazole, e.g., 3,5-dimethylpyrazole. In addition, it is also possible to use piperazine and/or piperazine derivatives.

In the solid insulation material, a carrier may comprise woven fabric, for example glass fiber fabric, nonwoven fabric, for example fleece, especially a polyester fleece, paper and/or film.

In this case, the carrier in the form of a film may also be perforated. In the solid insulation material, the particulate barrier material may be present on, in, and/or atop this carrier.

In some embodiments, the barrier material may be at least partly in platelet form. More particularly, it is possible to use mica, for example, as barrier material. In some embodiments, there is a coated particulate barrier material. More particularly, this may be a particulate barrier material with a metal oxide coating, for example tin oxide-, zinc oxide- or titanium oxide-coated particles. In some embodiments, there is a doped coating of the particulate barrier material, especially in platelet form.

In some embodiments, the tape adhesive bonds the at least one carrier and the barrier material in the solid insulation material. It is present in the solid insulation material in an amount in the range from 1% to 30% by weight, 2% to 15% by weight, or 5% to 10% by weight.

In some embodiments, the curing catalyst, also called "tape curing catalyst" or else "tape accelerator", is present in the solid insulation material in a concentration of less than 10% by weight, for example from 0.001% by weight to 7.5% by weight, in the range from 0.01% by weight to 5% by weight, or from 0.1% by weight to 3.5% by weight, such that gelation times of several hours are achievable.

In some embodiments, the first curing catalyst initiates the polymerization of the impregnating resin at temperatures in the range from 20° C. to 100° C., from 50° C. to 80° C. or from 55° C. to 75° C.

For achievement of a required storage stability in the solid insulation material, for example at room temperature and especially with a vacuum hold temperature and impregnation temperature lasting for several hours, the curing catalyst may be comparatively inert with respect to the tape adhesive material.

This is especially also true under the conditions of the vacuum hold temperature and/or impregnation temperature, which is, for example, in the range between 20° C. and 100° C., between 50° C. and 80° C., or between 55° C. and 75° C. For example, suitable tape adhesives are diols, triols and/or polyols.

The teachings herein relate to a solid insulation material, e.g., in tape form, to the use thereof in a vacuum impregnation process and to an insulation system produced therewith, and also to an electrical machine comprising the insulation system, especially for the medium- and high-voltage sector, namely for medium- and high-voltage machines, especially rotating electrical machines in the medium- and high-voltage sector, and semifinished products for electrical switchgear. It is a feature of the solid insulation material and the insulation system produced therewith that it is producible in an anhydride-free manner.

What is claimed is:

1. An insulation system, the system comprising:
    a solid insulation material comprising:
        a carrier;
        a barrier material;
        a curing catalyst; and
        a tape adhesive;
    an anhydride-free impregnating agent;
    wherein the curing catalyst and the tape adhesive are inert toward one another at standard atmospheric conditions, but react under vacuum when combined with the impregnating agent in a vacuum impregnation process to form a mixture with gelation times of 1 h to 15 h at an impregnation temperature in a range between 20 degrees Celsius and 100 degrees Celsius;
    wherein the tape adhesive comprises a carbon-based organic compound with at least two free hydroxyl groups and free of oxirane groups; and;
    wherein the curing catalyst is selected from the group consisting of: cationic superacids and superacid salts.

2. The insulation system as claimed in claim 1, wherein the tape adhesive within a temperature range from 60° C. to 70° C. shows a viscosity between 0.5 and 100 Pas.

3. The insulation system as claimed in claim 1, wherein the tape adhesive does not melt or soften at a temperature below 100° C.

4. The insulation system of claim 1, wherein the tape adhesive comprises tricyclodecanedimethanol.

5. The insulation system of claim 1, wherein the tape adhesive comprises polyvinyl acetal.

6. The insulation system of claim 5, wherein the polyvinyl acetal comprises the at least two free hydroxyl groups present as polyvinyl alcohol in an amount less than 35 mol %.

7. The insulation system as claimed in claim 1, wherein the tape adhesive comprises at least one compound selected from the group consisting of ester polyols, polyester polyols, linear polyester polyols, branched polyester polyols, hydroxy-functional polyester polyols, hydroxy-functional dendritic polyester polyols, polyester polyols based on propionic acid or based on alkyl-substituted propionic acid, a polyester polyol based on a bis(hydroxyalkyl)propionic acid, a polyol based on 2,2-bis(hydroxymethyl)propionic acid.

8. The insulation system as claimed in claim 1, further comprising a carrier comprising woven fabric, nonwoven fabric, or film.

9. The insulation system as claimed in claim 8, comprising a perforated film.

10. The insulation system as claimed in claim 1, comprising a particulate barrier material.

11. The insulation system as claimed in claim 10, wherein the particulate barrier material comprises barrier material particles at least partly in platelet form.

12. The insulation system as claimed in claim 11, wherein the particles of the barrier material have been coated.

13. The insulation system as claimed in claim 12, wherein the coating comprises a metal oxide.

14. The insulation system as claimed in claim 12, wherein the coating has been doped.

15. The insulation system as claimed in claim 1, wherein the tape adhesive amounts to from 1% to 30% by weight of a total weight of the insulation material.

16. The insulation system as claimed in claim 1, wherein the curing catalyst comprises less than 10% by weight of a total weight of the insulation material.

* * * * *